United States Patent
Zhuo et al.

(10) Patent No.: US 11,500,726 B2
(45) Date of Patent: Nov. 15, 2022

(54) METHOD, DEVICE, AND PROGRAM PRODUCT FOR SELECTING REBUILD DESTINATION IN STORAGE SYSTEM

(71) Applicant: EMC IP Holding Company LLC, Hopkinton, MA (US)

(72) Inventors: Baote Zhuo, Beijing (CN); Jian Gao, Beijing (CN); Lifeng Yang, Beijing (CN); Xinlei Xu, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 197 days.

(21) Appl. No.: 16/936,710

(22) Filed: Jul. 23, 2020

(65) Prior Publication Data

US 2021/0173742 A1    Jun. 10, 2021

(30) Foreign Application Priority Data

Dec. 6, 2019    (CN) .................. 201911240945.X

(51) Int. Cl.
*G06F 11/07* (2006.01)
*G06F 11/10* (2006.01)
*G06F 3/06* (2006.01)

(52) U.S. Cl.
CPC ........ *G06F 11/1092* (2013.01); *G06F 3/0619* (2013.01); *G06F 3/0644* (2013.01); *G06F 3/0653* (2013.01); *G06F 3/0689* (2013.01); *G06F 11/076* (2013.01)

(58) Field of Classification Search
CPC ............... G06F 11/1092; G06F 3/0619; G06F 3/0644; G06F 3/0653; G06F 3/0689; G06F 11/076; G06F 3/065; G06F 3/0665; G06F 3/0614; G06F 3/0629; G06F 3/064; G06F 11/2094
See application file for complete search history.

(56) References Cited

U.S. PATENT DOCUMENTS

| | | | |
|---|---|---|---|
| 8,812,902 B2 | 8/2014 | Deepak | |
| 8,839,028 B1 | 9/2014 | Polia et al. | |
| 10,642,690 B1* | 5/2020 | Tian | ........................ G06F 3/061 |
| 11,150,989 B2 | 10/2021 | Gao et al. | |
| 2017/0270018 A1 | 9/2017 | Xiao et al. | |
| 2019/0332479 A1* | 10/2019 | Gao | .................... G06F 11/1092 |
| 2020/0133810 A1* | 4/2020 | Gao | ..................... G06F 3/0659 |
| 2021/0334183 A1 | 10/2021 | Gao et al. | |

* cited by examiner

*Primary Examiner* — Matthew M Kim
*Assistant Examiner* — Kyle Emanuele
(74) *Attorney, Agent, or Firm* — BainwoodHuang

(57) ABSTRACT

In techniques for selecting a rebuild destination in a storage system, a failed stripe group associated with a failed extent group in a failed storage device among storage devices is detected. A group of normal storage devices other than the failed storage device is determined. Regarding a normal storage device in the group of normal storage devices, a first count for the normal storage device is obtained, the first count representing a number of failed stripes which are allowed to be rebuilt to the normal storage device in the failed stripe group. Based on the first count, a destination storage device is selected from the group of normal storage devices for rebuilding a failed stripe in the failed stripe group. During rebuild, a destination for rebuilding the failed stripe may be effectively selected, and extents in reserved space in the storage system may be more fully utilized.

20 Claims, 11 Drawing Sheets

METHOD, DEVICE, AND PROGRAM PRODUCT FOR SELECTING REBUILD DESTINATION IN STORAGE SYSTEM

CROSS-REFERENCE TO RELATED APPLICATION

This application claims priority to Chinese Patent Application No. CN201911240945.X, on file at the China National Intellectual Property Administration (CNIPA), having a filing date of Dec. 6, 2019, and having "METHOD, DEVICE, AND PROGRAM PRODUCT FOR SELECTING REBUILD DESTINATION IN STORAGE SYSTEM" as a title, the contents and teachings of which are herein incorporated by reference in their entirety.

FIELD

Various implementations of the present disclosure relate to management of a storage system, and more specifically, to a method, device and computer program product for selecting a rebuild destination for a failed extent in a storage system.

BACKGROUND

With the development of data storage technology, various data storage devices now provide users with increasingly large data storage capability, and also their data access speed has been greatly improved. With the increase of data storage capability, users also impose higher demands on data reliability and response time of storage systems. So far various data storage systems based on Redundant Arrays of Independent Disks (RAID) have been developed to improve data reliability. When one or more disks in a storage system fail(s), data in failed disk(s) can be recovered from other normal disk(s).

A mapped Redundant Array of Disks has emerged, and storage space may be reserved on a plurality of storage devices in a storage system for rebuilding data in a failed extent in a failed storage device. Basic principles of RAID should be followed during selection of a destination storage device for the failed extent. In other words, it should be ensured that the selected storage device is different from storage devices where other extents in a failed stripe to which the failed extent belong reside. At this point, it has become a focus of research for selecting a rebuild destination for the failed stripe so as to make the best of all reserved storage space in the storage system.

SUMMARY

Therefore, it is desirable to develop and implement a technical solution for managing a storage system more effectively. It is desired that the technical solution be compatible with existing storage systems, and by reconstructing configurations of existing storage systems, selecting a rebuild destination in the storage system will be handled more effectively.

According to a first aspect of the present disclosure, a method is provided for selecting a rebuild destination in a storage system, where the storage system includes a plurality of storage devices. In the method, a group of failed stripes associated with a group of failed extents in a failed storage device among the plurality of storage devices are detected. A group of normal storage devices other than the failed storage device among the plurality of storage devices are determined. Regarding a normal storage device in the group of normal storage devices, a first count for the normal storage device is obtained, the first count representing the number of failed stripes which are allowed to be rebuilt to the normal storage device in the group of failed stripes. Based on the first count, a destination storage device is selected from the group of normal storage devices for rebuilding a failed stripe in the group of failed stripes.

According to a second aspect of the present disclosure, an electronic device is provided, the electronic device including: at least one processor; and a memory coupled to the at least one processor, the memory having instructions stored thereon, the instructions, when executed by the at least one processor, causing the electronic device to perform acts for selecting a rebuild destination in a storage system, which includes a plurality of storage devices. The acts include: detecting a group of failed stripes associated with a group of failed extents in a failed storage device among the plurality of storage devices; determining a group of normal storage devices other than the failed storage device among the plurality of storage devices; regarding a normal storage device in the group of normal storage devices, obtaining a first count for the normal storage device, the first count representing a number of failed stripes which are allowed to be rebuilt to the normal storage device in the group of failed stripes; and selecting, based on the first count, a destination storage device from the group of normal storage devices for rebuilding a failed stripe in the group of failed stripes.

According to a third aspect of the present disclosure, a computer program product is provided. The computer program product is tangibly stored on a non-transitory computer-readable medium and includes machine-executable instructions which are used to implement a method according to the first aspect of the present disclosure.

BRIEF DESCRIPTION OF THE DRAWINGS

Through the more detailed description in the accompanying drawings, features, advantages and other aspects of the implementations, the present disclosure will become more apparent. Several implementations of the present disclosure are illustrated schematically and are not intended to limit the present invention. In the drawings.

DETAILED DESCRIPTION OF IMPLEMENTATIONS

Figure 1A:
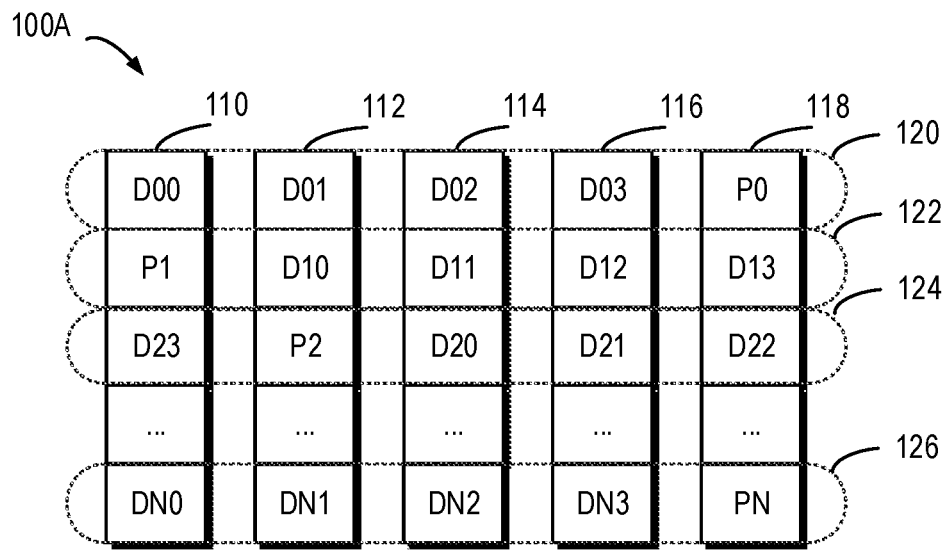
FIGS. 1A and 1B show a block diagram of a storage system in which implementations of the present disclosure may be implemented, respectively.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more detail with reference to the drawings. Although the drawings illustrate the preferred implementations of the present disclosure, it should be appreciated that the present disclosure can be implemented in various ways and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

First, description is presented below for an application environment of the present disclosure. In the context of the present disclosure, the storage system may be a RAID-based storage system. The RAID-based storage system may combine a plurality of storage devices into an array of disks. By providing redundant storage devices, the reliability of an entire disk group significantly exceeds that of a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, RAID-10, RAID-50, etc. For more details about RAID levels, those skilled in the art may refer to https://en.wikipedia.org/wiki/Standard_RAID_levels and https://en.wikipedia.org/wiki/Nested_RAID_levels, etc.

FIG. 1A schematically illustrates a block diagram of a storage system 100A in which a method of the present disclosure may be implemented. In the storage system shown in FIG. 1A, working principles of RAID are illustrated by taking a RAID-5 (4D+1P, where 4D represents that 4 storage devices are included in the storage system for storing data, and 1P represents that 1 storage device is included in the storage system for storing parity) array that consists of five independent storage devices (110, 112, 114, 116 and 118) as an example. It should be noted that although five storage devices are schematically shown in FIG. 1A, in other implementations more or less storage devices may be comprised according to different levels of RAID. Moreover, although FIG. 1A illustrates stripes 120, 122, 124, . . . , and 126, in other examples the RAID system may further include a different number of stripes.

In RAID, a stripe may cross a plurality of physical storage devices (for example, the stripe 120 crosses the storage devices 110, 112, 114, 116 and 118). The stripe may be simply construed as a storage area among a plurality of storage devices which satisfies a given address range. Data stored in the stripe 120 includes a plurality of parts: a data block D00 stored in the storage device 110, a data block D01 stored in the storage device 112, a data block D02 stored in the storage device 114, a data block D03 stored in the storage device 116, and a data block P0 stored in the storage device 118. In this example, the data blocks D00, D01, D02 and D03 are stored data, and the data block P0 is a P parity of the stored data.

The mode of storing data in other stripes 122 and 124 is similar to that in the stripe 120, the difference being that the parity about other data blocks may be stored in storage devices other than the storage device 118. In this way, when one of the plurality of storage devices 110, 112, 114, 116 and 118 fails, data in the failed device may be recovered from other normal storage devices.

Figure 1B:
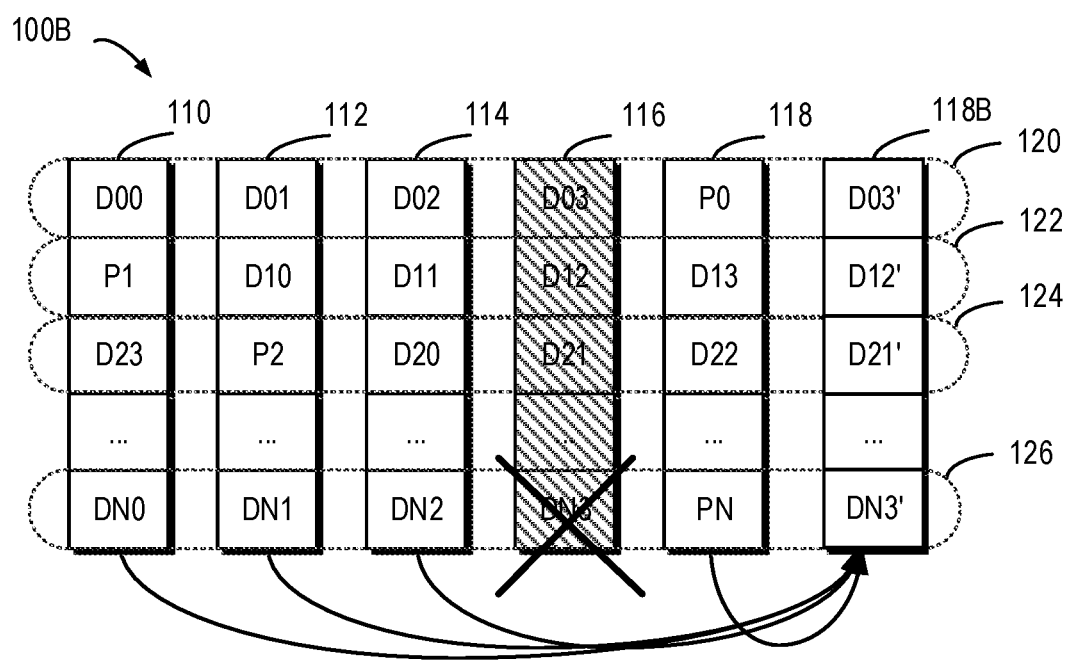

FIG. 1B schematically illustrates a block diagram 100B of a rebuilding process of the storage system 100A. As shown in FIG. 1B, when one storage device (e.g., the shaded storage device 116) fails, data may be recovered from the other storage devices 110, 112, 114 and 118 that operate normally. At this point, a new backup storage device 118B may be added to RAID to replace the storage device 118. In this way, recovered data may be written to 118B, and system rebuilding may be realized.

Note that while a RAID-5 storage system including 5 storage devices (among which 4 storage devices are used for storing data and 1 storage device is used for storing parity) has been described with reference to FIGS. 1A and 1B, according to the definition of other RAID levels, there may further exist a storage system including a different number of storage devices. Based on the definition of RAID-6, for example, two storage devices may be used to store parity P and Q, respectively. In another example, according to the definition of triple-parity RAID, three storage devices may be used to store parity P, Q and R, respectively.

Figure 2:
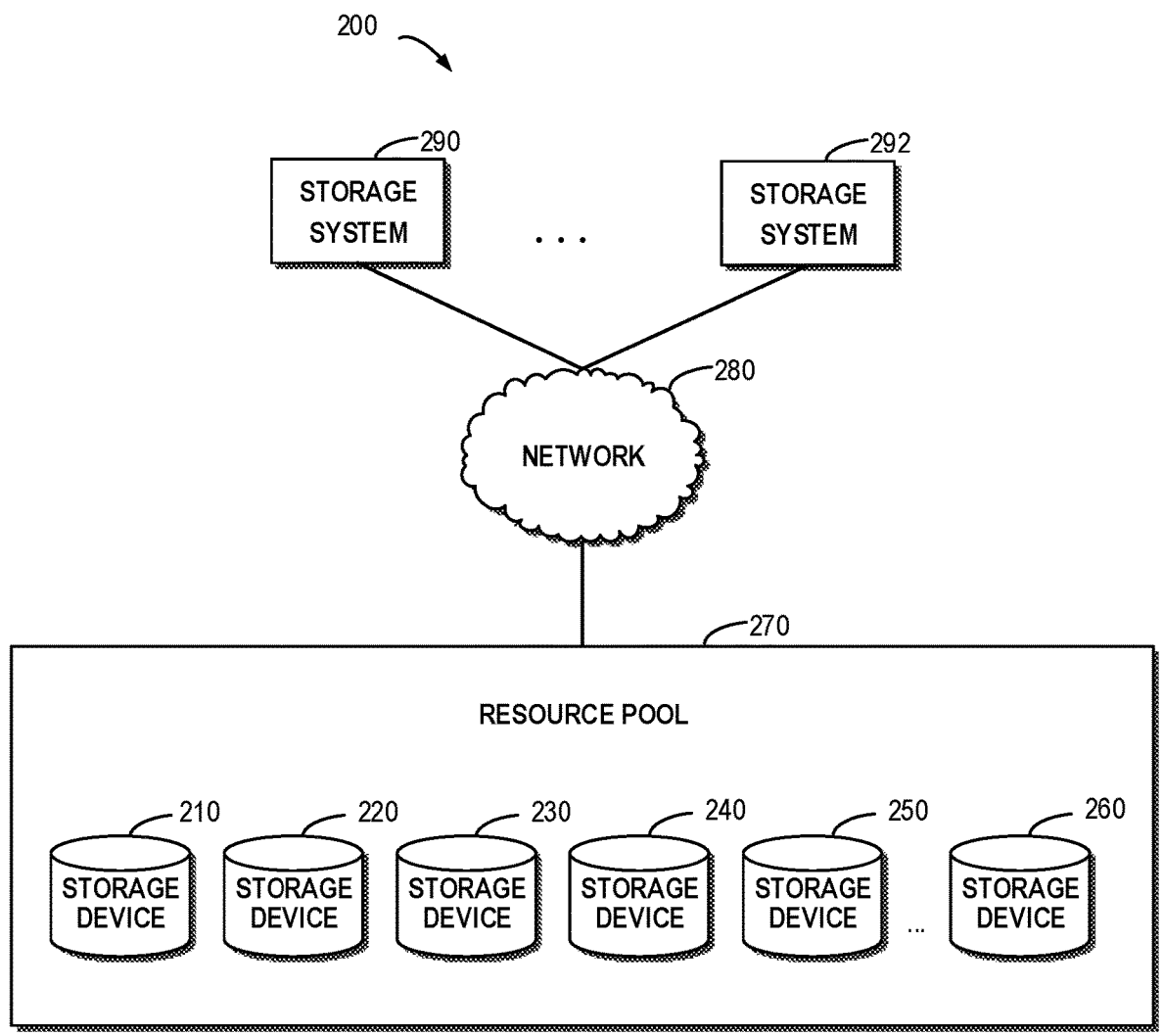
FIG. 2 schematically shows a block diagram of an example environment in which implementations of the present disclosure may be implemented.

With the development of distributed storage technologies, the various storage devices 110, 112, 114, 116 and 118 in the storage system shown in FIGS. 1A and 1B may no longer be limited to physical storage devices but may be virtual storage devices. For example, respective extents on the storage device 110 may come from different physical storage devices (hereinafter referred to as storage devices for short) in the resource pool. FIG. 2 schematically shows a block diagram of an example environment in which the method of the present disclosure may be implemented. As depicted, a storage resource pool 270 may include a plurality of physical storage devices 210, 220, 230, 240, 250, . . . , and 260. At this point, storage space in the plurality of storage devices may be allocated to a plurality of user storage systems 290, . . . , and 292. At this point, these user storage systems 290, . . . , and 292 may access the storage space in the various storage devices in the storage resource pool 270 via a network 280.

Figure 3:
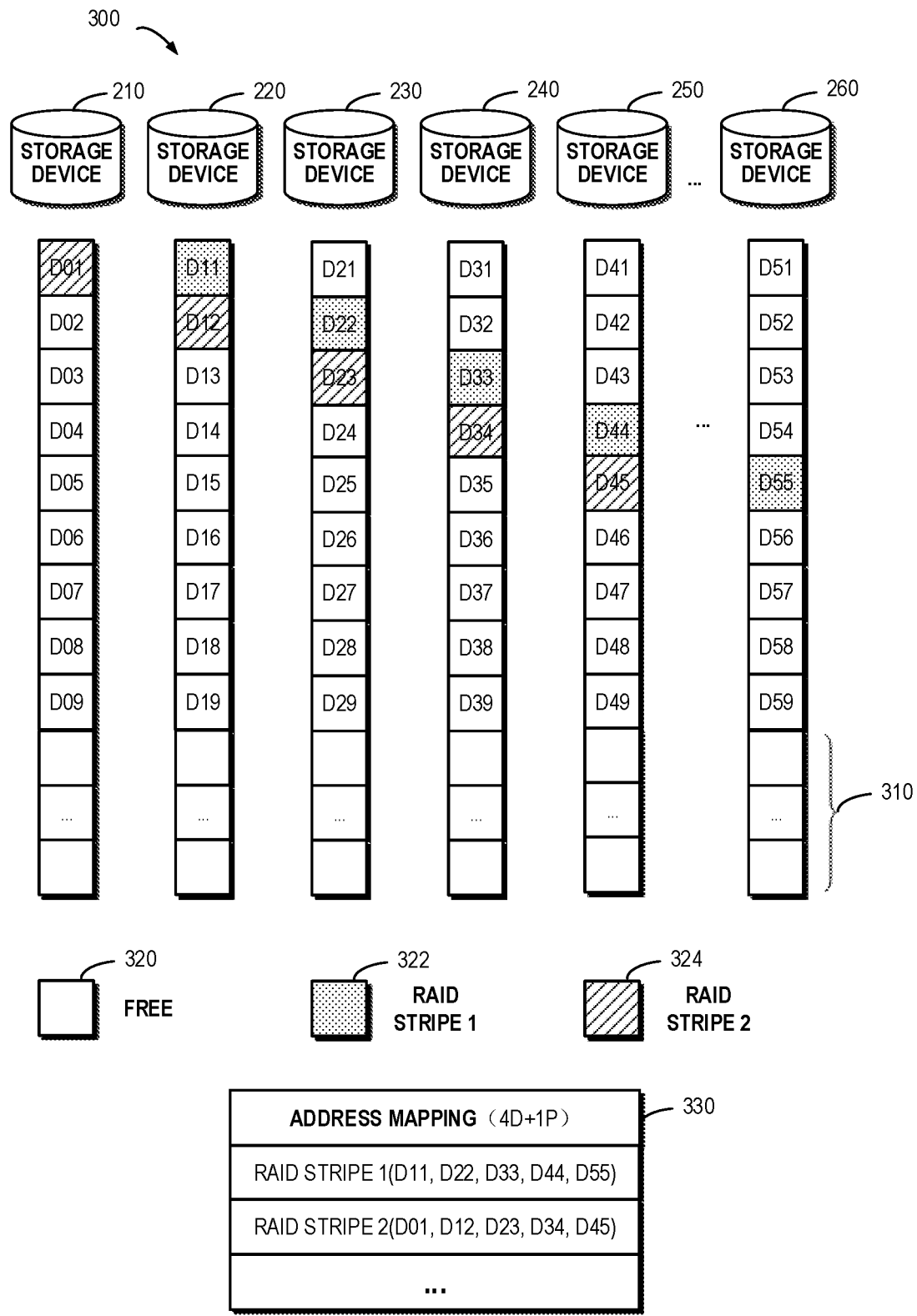
FIG. 3 schematically shows a diagram of a storage resource pool in FIG. 2.

FIG. 3 schematically shows a diagram of more information of the storage resource pool 270 shown in FIG. 2. The resource pool 270 may include a plurality of storage devices 210, 220, 230, 240, 250, . . . , and 260. Each storage device may include a plurality of extents, wherein a legend 320 represents a free extent, a legend 322 represents an extent for RAID stripe 1 of the storage system 110A in FIG. 1, and a legend 324 represents an extent for RAID stripe 2 of the storage system 110A in FIG. 1. At this point, extents D11, D22, D33 and D44 for RAID stripe 1 are used for storing data blocks of the stripe, respectively, and extent D55 is used for storing a parity of data. Extents D01, D12, D23 and D34 for RAID stripe 2 are used for storing data blocks of the stripe, respectively, and extent D45 is used for storing a parity of data.

As shown in FIG. 3, an address mapping 330 shows associations between a stripe and addresses of extents in the stripe. For example, RAID stripe 1 may include 5 extents, namely D11, D22, D33, D44 and D55, which reside on the storage devices 210, 220, 230, 240 and 250, respectively. As shown in FIG. 3, specifically, extent D11 is the first extent in the storage device 220, extent D22 is the second extent in the storage device 230. As shown in FIG. 3, there may exist a reserved spare portion 310 in each storage device, so that when a storage device in the resource pool fails, an extent in the spare portion 310 in each storage device may be selected to rebuild various extents in the failed storage device.

Note in FIG. 3 the 4D+1P RAID-5 storage system is taken as an example to illustrate how extents in various stripes are distributed over a plurality of storage systems in the resource pool. When RAID based on another level is employed, those skilled in the art may implement concrete details on the basis of the above described principles. For example, in the 6D+1P+1Q RAID-6 storage system, 8 extents in each stripe may be distributed over a plurality of storage devices so as to ensure a load balance between the plurality of storage devices.

Figure 4:
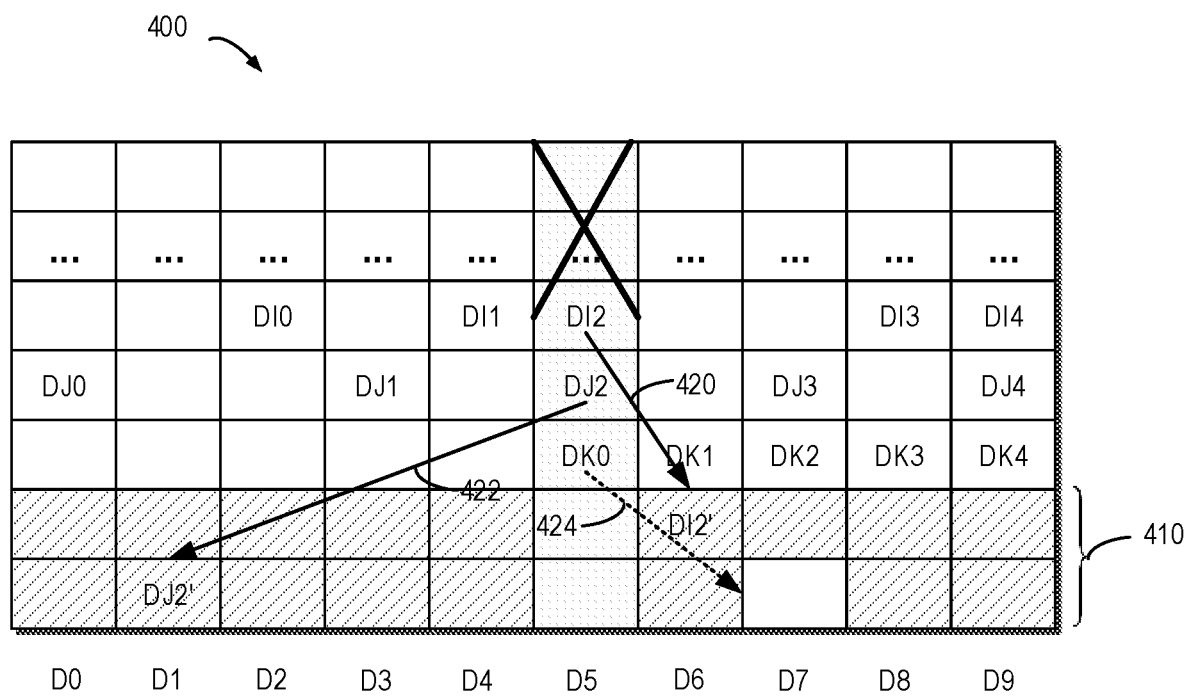
FIG. 4 schematically shows a block diagram of a process for selecting a rebuild destination in a storage system according to example implementations of the present disclosure.

Technical solutions have been proposed to rebuild data in a failed extent to reserved space in a storage device. FIG. 4 schematically shows a block diagram 400 of a process for selecting a rebuild destination in a storage system according to one technical solution. As depicted, the storage system includes 10 storage devices (represented as storage devices D0 to D9, respectively), and each storage device includes reserved space 410. It will be understood that the number of extents in the reserved space 410 in each storage device is determined according to the number of storage devices in the storage system and the number of extents in each storage device. When one storage device in the storage system fails, a capacity of all reserved space in the storage system should be sufficient to accommodate all extents in a rebuild failed storage device.

For the sake of description, the reserved space in each storage device in FIG. 4 includes only two extents. In this figure, the storage device D5 fails, and data in failed extents Di2, Dj2 and Dk0 in the failed storage device needs to be rebuilt to the reserved space 410 in the storage devices D0 to D4 and D6 to D9. A failed stripe to which the failed extent Di2 belongs includes extents Di0, Di1, Di2, Di3 and Di4, and these extents reside on the storage devices D2, D4, D5, D8 and D9, respectively. A failed stripe to which the failed extent Dj2 belongs includes extents Dj0, Dj1, Dj2, Dj3 and Dj4, and these extents reside on the storage devices D0, D3, D5, D7 and D9, respectively. A failed stripe to which the failed extent Dk0 belongs includes extents Dk0, Dk1, Dk2, Dk3 and Dk4, and these extents reside on the storage devices D5 to D9, respectively.

It will be understood that when selecting a storage device to which the failed extent will be rebuilt, the following 3 conditions need to be considered: 1) the selected destination storage device should be a normal storage device; 2) the selected destination storage device should include a free reserved extent; 3) the selected destination storage device should be different from storage devices where any extents in a stripe to which the failed extent belong reside. Suppose the failed extent Di2 in the failed storage device has been rebuilt to an extent Di2', and the failed extent Dj2 in the failed storage device has been rebuilt to an extent Dj2', then at this point a destination storage device needs to be selected for the failed extent Dk0.

As shown in FIG. 4, the storage device D7 is a normal storage device (satisfying the condition 1), and the last extent in this storage device is a free reserved extent (satisfying the condition 2). Nevertheless, the extent Dk2 included in the stripe to which the failed extent Dk0 belongs resides on the storage device D7, so this storage device does not satisfy the condition 3. Therefore, the failed extent Dk0 should not be rebuilt to the storage device D7. At this point, no other free reserved extent is available in the storage system, so it is impossible to make sufficient use of all extents in the reserved space 410 or to rebuild all failed extents in the failed storage device. Therefore, a destination storage device has to be reselected for various failed extents in the failed storage device.

It will be understood that although approaches have been proposed to select a destination storage device depending on how many times a storage device has been selected for rebuild and/or based on the number of free extents in reserved space, these approaches may result in the problems as shown in FIG. 4. Therefore, it is desirable to select a destination storage device in a more straightforward and effective way and further ensure that all failed extents in the failed storage device can be rebuilt.

In order to at least partly overcome the above drawbacks, a concept of an availability count of a normal storage device (referred to as a first count for short) is introduced according to example implementations of the present disclosure. After a failed storage device occurs in a storage system, an availability count may be determined with respect to a normal storage device. Here, the availability count refers to the number of failed stripes, which are allowed to be rebuilt to the normal storage device, in a group of failed stripes in the storage system. Suppose each storage device in the storage system includes m extents, among which there are m0 reserved extents. At this point, each storage device may include m−m0 extents for storing regular data and m0 extents for storing rebuilt data. At this point, if a given storage device fails, this storage device will have m−m0 failed extents. Each failed extent resides in one failed stripe, so the whole storage system will involve m−m0 failed stripes.

If the m−m0 failed extents include no extent that resides on a normal storage device A, then the availability count of the normal storage device A may be denoted as m−m0. If an extent in one failed stripe among the m−m0 failed stripes resides on the normal storage device A, then the availability count of the normal storage device A may be denoted as m−m0−1. According to example implementations of the present disclosure, the availability count may represent a capability of a normal storage device for rebuild operations. The larger the availability count is, there are more failed stripes that the normal storage device may serve.

Figure 5:
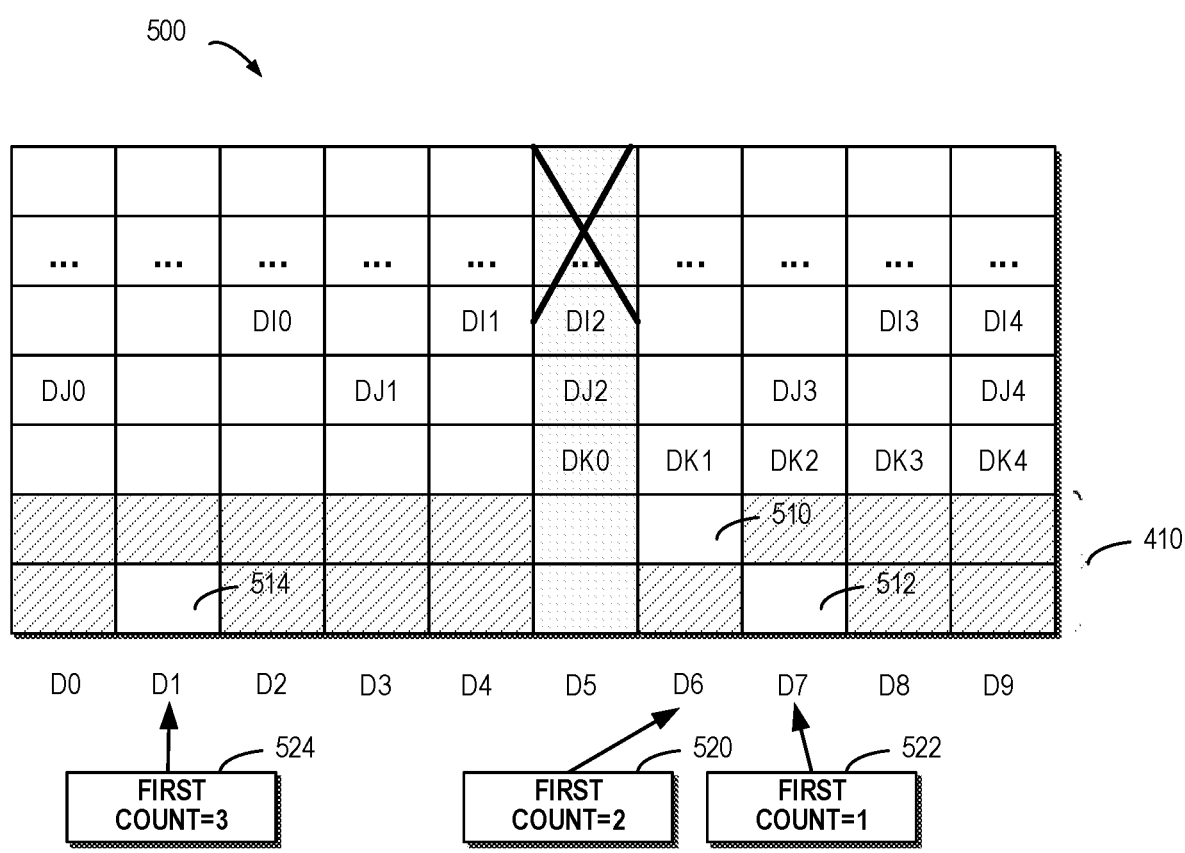
FIG. 5 schematically shows a flowchart of a process for selecting a rebuild destination in a storage system according to example implementations of the present disclosure.

FIG. 5 schematically shows a block diagram 500 of a process for selecting a rebuild destination in a storage system according to example implementations of the present disclosure. As depicted, the storage system includes 10 storage devices, namely storage devices D0 to D9, among which storage device D5 fails. At this point, an availability count may be determined for the normal storage devices D0 to D4 and D6 to D9 other than the failed storage device, respectively. To simplify the description, FIG. 5 merely schematically shows availability counts (i.e., first counts) for three storage devices that include free reserved extents 510, 512 and 514, respectively.

Specifically, a first count 524 may be determined for the storage device D1 that includes the free reserved extent 514, a first count 520 may be determined for the storage device D6 that includes the free reserved extent 510, and a first count 522 may be determined for the storage device D7 that includes the free reserved extent 512. A destination storage device for rebuilding a failed stripe in the group of failed stripes may be selected from the group of normal storage devices based on the first count. More details on how to select the rebuild destination will be provided with reference to FIG. 6.

Figure 6:
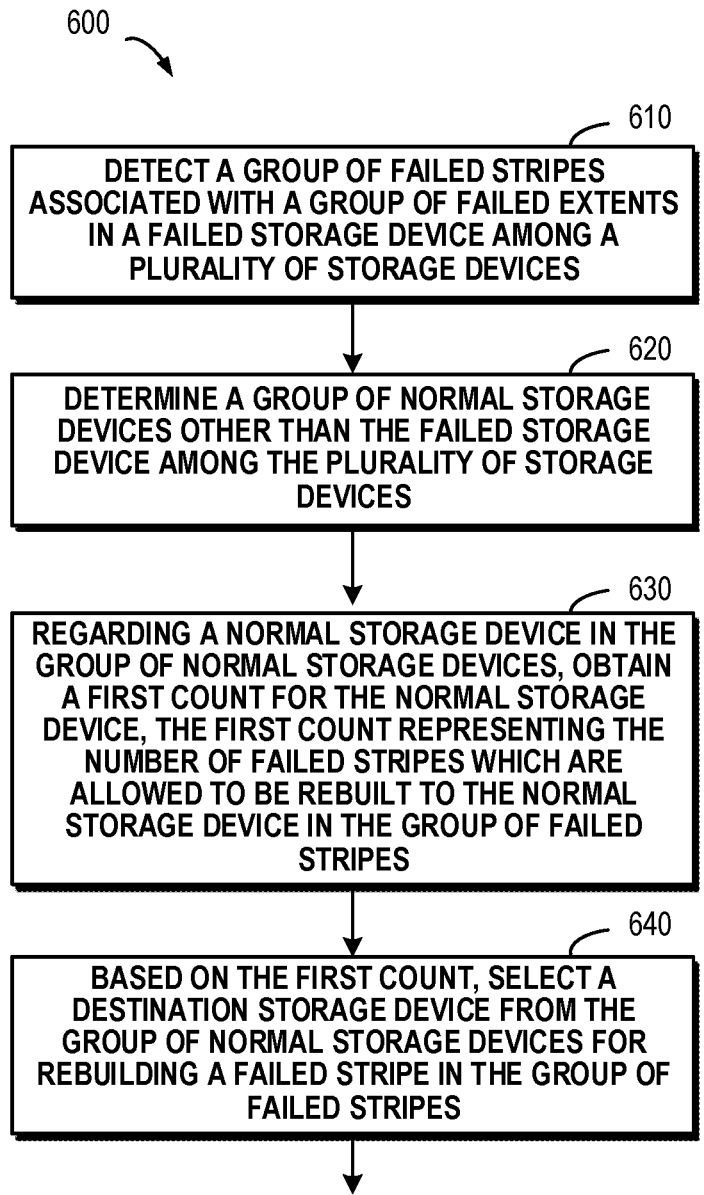
FIG. 6 schematically shows a flowchart of a method for selecting a rebuild destination in a storage system according to example implementations of the present disclosure.

FIG. 6 schematically shows a flowchart of a method 600 for selecting a rebuild destination in a storage system according to example implementations of the present disclosure. As depicted, at block 610, a group of failed stripes associated with a group of failed extents in a failed storage device among a plurality of storage devices may be detected. Here, the failed stripe refers to a stripe including a failed extent in the failed storage device. In a 4D+1P storage system, each failed stripe may include 5 extents, among which one failed extent resides on the failed storage device, and the other 4 normal extents reside on 4 normal storage devices, respectively. Continuing the above example, if a storage device includes m extents among which m0 extents reside on reserved space, then the storage system will have m−m0 failed stripes.

At block 620, a group of normal storage devices other than the failed storage device may be determined among the plurality of storage devices. It will be understood that the number n of storage devices in the storage system should satisfy certain limits. For example, the number of storage devices should be larger than the width of the storage system (i.e., 4+1=5). In another example, an upper limit (e.g., 25 or other value) may be set for the number n of storage devices in the storage system for the purpose of lowering the management complexity or other reasons. Schematic implementations of the present disclosure will be described in a context that one storage device in the 4D+1P storage system fails.

Figure 7:
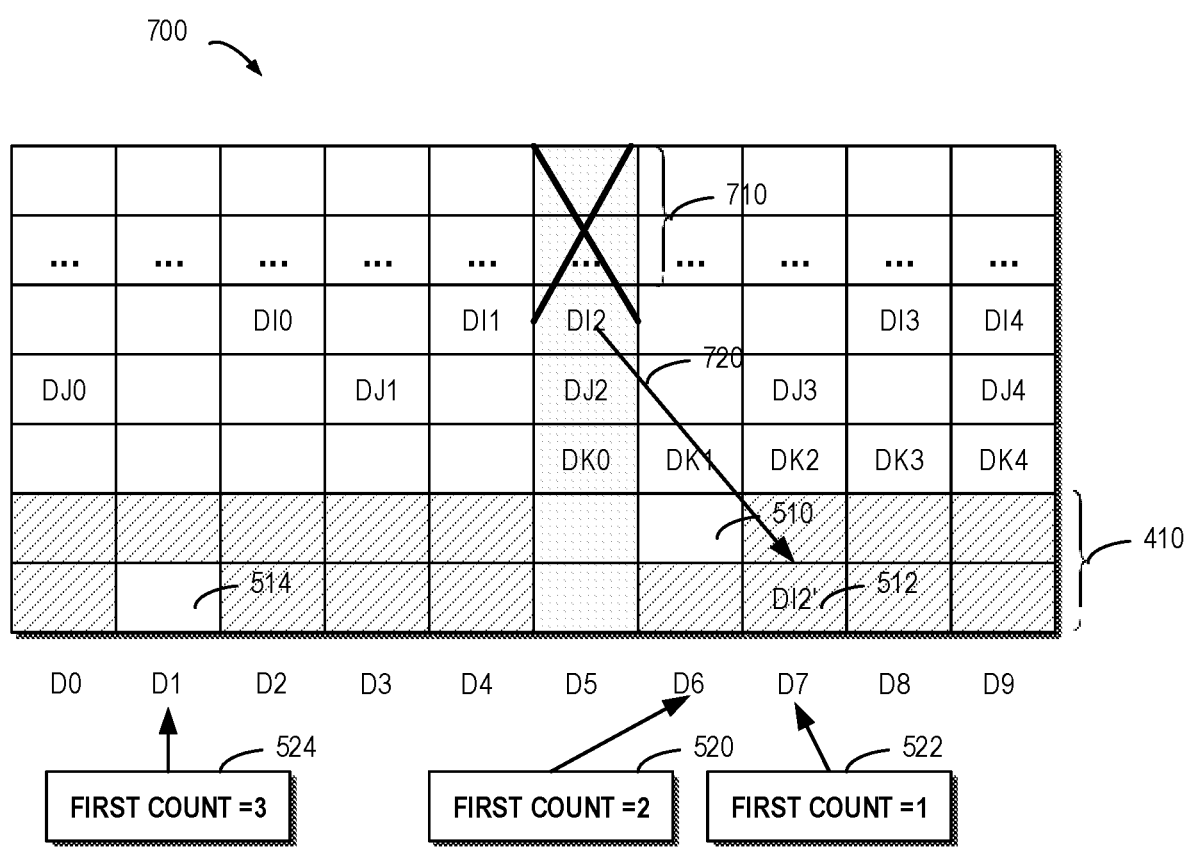
FIG. 7 schematically shows a block diagram of a process for selecting one free reserved extent in a storage system according to example implementations of the present disclosure.

At block 630, regarding a normal storage device in the group of normal storage devices, a first count for the normal storage device may be obtained, here the first count representing the number of failed stripes which are allowed to be rebuilt to the normal storage device in the group of failed stripes. More details on how to determine the first count will be described with reference to FIG. 7. This figure schematically shows a block diagram 700 of the process for selecting one free reserved extent in a storage system according to example implementations of the present disclosure. In FIG. 7, suppose the storage device D5 fails, and various failed extents in this storage device need to be rebuilt. Suppose rebuild destinations have been determined for a group of failed extents 710 in starting positions of the storage device D5, and now a rebuild destination needs to be selected for the failed extents Di2, Dj2 and Dk0.

According to example implementations of the present disclosure, the first count may be determined for each normal storage device one by one. First, a normal storage device may be selected, and each failed stripe in the group of failed stripes may be traversed. Specifically, it may be determined whether the failed stripe involves the normal storage device, so as to determine whether the normal storage device can be used to rebuild the failed stripe. Subsequently, the first count may be updated according to a result of the determining. Initially, the first count for the normal storage device may be set to 0, and regarding a failed stripe in the group of failed stripes, it may be determined whether the failed stripe involves the normal storage device. If the failed stripe does not involve the normal storage device, the first count may be increased. Alternatively and/or additionally, the first count for the normal storage device may be initially set to m−m0, and regarding a failed stripe in the group of failed stripes, it may be determined whether the failed stripe involves the normal storage device. If the failed stripe involves the normal storage device, the first count may be decreased.

The first count may be determined for a normal storage device with a free reserved extent in the storage system. A group of storage devices where a group of extents in the failed stripe reside may be determined, and in accordance with determining that the normal storage device is different from any one in the group of storage devices, it is determined that the failed stripe does not involve the normal storage device. As shown in FIG. 7, the normal storage device D1 includes the free reserved extent 514, and since the storage device D1 does not include any extent that belongs to the failed stripe, the free reserved extent 514 may be used as the destination for rebuilding 3 stripes to which the failed extents Di2, Dj2 and Dk0 belong. Therefore, the first count 524 of the normal storage device D1 may be set to 3.

Then, the first count for the next normal storage device including a free reserved extent may be determined. As shown in FIG. 7, the normal storage device D6 includes the free reserved extent 510. At this point, a group of storage devices where a group of extents in the failed stripe reside may be determined. The failed stripe to which the failed extent Dk0 belongs includes extents Dk0, Dk1, Dk2, Dk3 and Dk4, and the extent Dk1 resides on the normal storage device D6. This means that the free reserved extent 510 in the normal storage device D6 cannot be used to rebuild the failed extent Dk0, so the first count 520 of the normal storage device D6 may be set to 3−1=2.

Then, the first count for the next normal storage device including a free reserved extent may be determined. As shown in FIG. 7, the normal storage device D7 includes the free reserved extent 512. At this point, it may be determined that the failed stripe to which the failed extent Dj2 belongs includes extents Dj0, Dj1, Dj2, Dj3 and Dj4, and the failed extent Dk2 resides on the normal storage device D7. The failed stripe to which the failed extent Dk0 belongs includes extents Dk0, Dk1, Dk2, Dk3 and Dk4, and the failed extent Dk2 resides on the normal storage device D7. This means that the free reserved extent 512 in the normal storage device D7 cannot be used to rebuild the failed extents Dj2 and Dk0, so the first count 522 of the normal storage device D7 may be set to 3−2=1.

Returning to FIG. 6, at block 640, a destination storage device for rebuilding a failed stripe in the group of failed stripes may be selected from the group of normal storage devices based on the first count. It will be understood that the first count represents the number of failed stripes which a normal storage device may serve. With example implementations of the present disclosure, free reserved space in a normal storage device that can only serve a small number of failed stripes may be utilized first. In this way, after several rounds of selecting, normal storage devices where remaining free reserved extents reside will have larger first counts, which means the remaining extents may serve a large number of failed extents. Further, it may be ensured that a situation for not making sufficient use of free reserved space as shown in FIG. 4 can be avoided as much as possible.

According to example implementations of the present disclosure, a normal storage device with a smaller first count may be selected from the group of normal storage devices to be used as the destination storage device. In the example of FIG. 7, since the first count for the normal storage device D7 is 1 and is less than the first counts 2 and 3 for the other two normal storage devices, at this point the free reserved extent 512 may be selected from the normal storage device D7. As shown by an arrow 720, the free reserved extent 512 may be selected, so that data in the failed extent Di2 may be rebuilt to form a rebuilt extent Di2' during the subsequent rebuilding process.

It will be understood that the smaller the value of the first count for a normal storage device is, the smaller is the number of failed stripes which the normal storage device may serve. At this point, preferably, the free reserved extent in this normal storage device may be used for rebuilding. As various failed extents in the failed storage device are traversed, the free reserved extent in a normal storage device with a smaller first count will be exhausted first, and then remaining normal storage devices with free reserved extents will have larger first counts. This means that these normal storage devices with larger first counts may serve more failed stripes, and further a situation of free reserved extents in normal storage devices cannot be allocated may be avoided.

Where the free reserved extent 512 has been selected from the normal storage device D7, since one failed stripe has been processed, the number of failed stripes that are to be processed in the storage system changes. Therefore, after selecting the free reserved extent, the first count for each normal storage device needs to be updated. Specifically, the first count for each normal storage device may be decreased by 1.

Still with reference to the example in FIG. 7, before the destination storage device is selected, the first counts for the normal storage devices D1, D6 and D7 are 3, 2 and 1, respectively; after the free reserved extent 512 is selected from the normal storage device D7, each first count may be decreased by 1. The updated first counts for the normal storage devices D1, D6 and D7 are 2, 1 and 0, respectively.

More details on how to select a destination storage device for the next failed extent Dj2 in the failed storage device D5 will be described with reference to FIG. 8 below.

Figure 8:
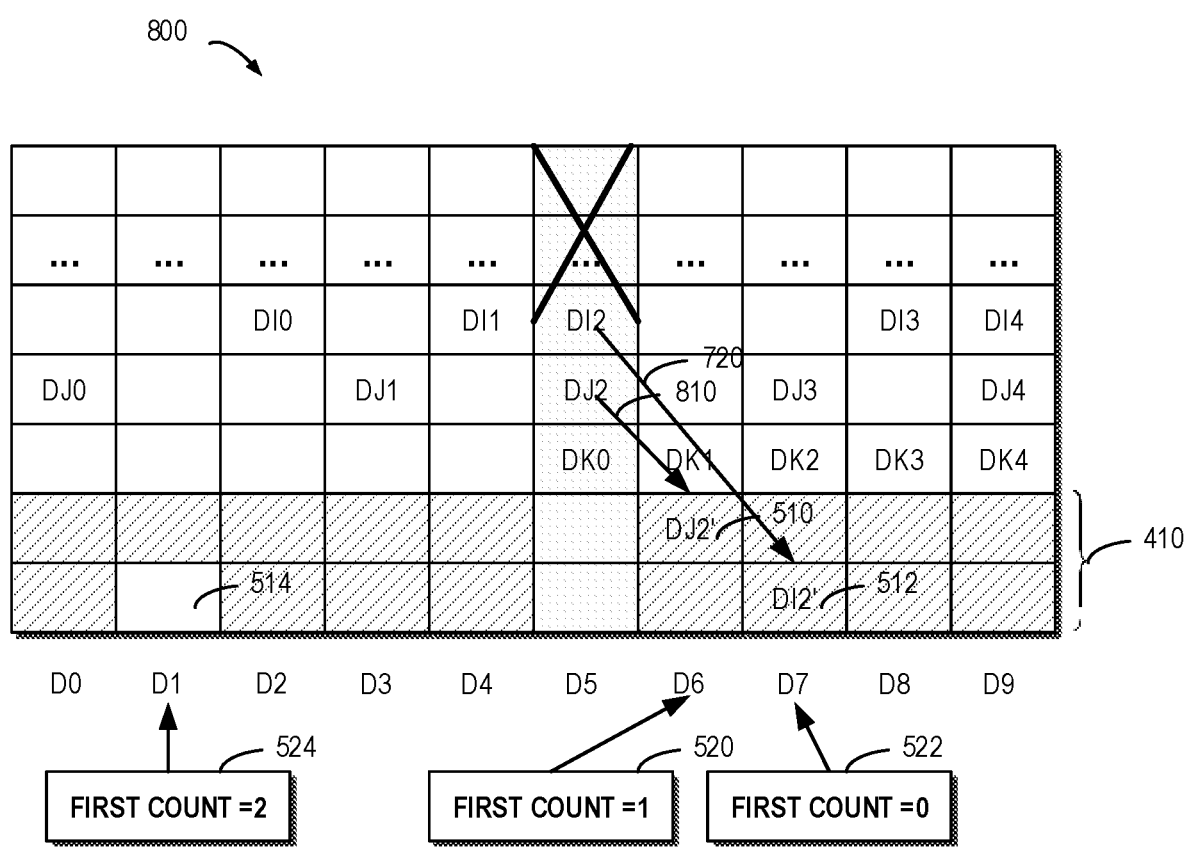
FIG. 8 schematically shows a block diagram of a process for selecting another free reserved extent in a storage system according to example implementations of the present disclosure.

FIG. 8 schematically shows a block diagram 800 of a process for selecting another free reserved extent in a storage system according to example implementations of the present disclosure. As depicted, at this point the first counts 524, 520 and 522 for the normal storage devices D1, D6 and D7 have been updated to 2, 1 and 0, respectively. The storage device D7 no longer includes a free reserved extent, so this storage device is not considered when selecting the minimum first count. Since the first count for the normal storage device D6 is 1, which is less than 2 of the normal storage device D1, at this point the free reserved extent 510 may be selected from the normal storage device D6. As shown by an arrow 810, the free reserved extent 510 may be selected, so that data in the failed extent Dj2 may be rebuilt to form a rebuilt extent Dj2' during the subsequent rebuilding process.

After the free reserved extent 510 has been selected from the normal storage device D6, since one failed stripe has been processed, the number of failed stripes that are to be processed in the storage system changes. The first count for each normal storage device may be decreased by 1, and thus the updated first counts for the normal storage devices D1, D6 and D7 are 1, 0 and 0, respectively. It will be understood that since the normal storage devices D6 and D7 no longer include a free reserved extent, their first counts are both set to 0. More details on how to select a destination storage device for the next failed extent Dk0 in the failed storage device D1 will be described with reference to FIG. 9 below.

Figure 9:
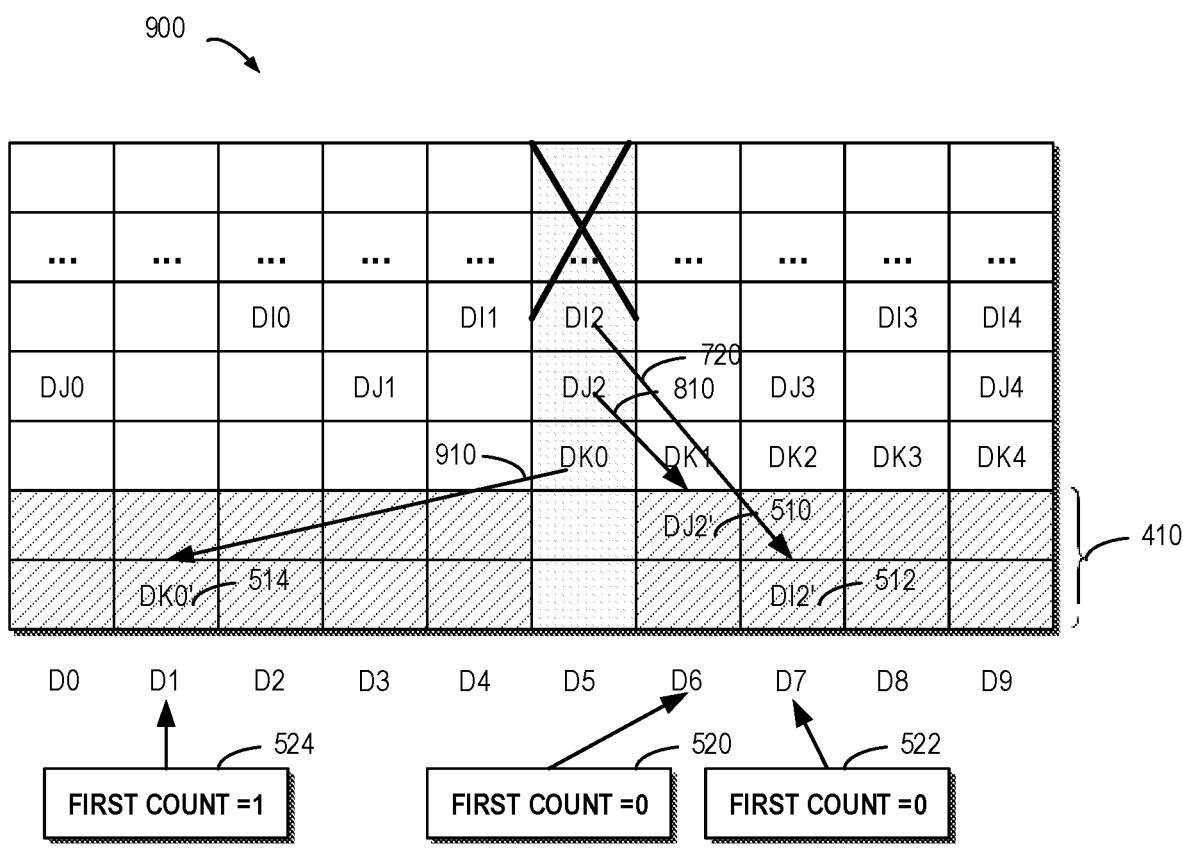
FIG. 9 schematically shows a block diagram of a process for selecting still another free reserved extent in a storage system according to example implementations of the present disclosure.

FIG. 9 schematically shows a block diagram 900 of a process for selecting still another free reserved extent in a storage system according to example implementations of the present disclosure. As depicted, at this point the first counts 524, 520 and 522 for the normal storage devices D1, D6 and D7 have been updated to 1, 0 and 0, respectively, and the free reserved extent 514 may be selected from the normal storage device D1. As shown by an arrow 910, the free reserved extent 514 may be selected, so that data in the failed extent Dk0 may be rebuilt to form a rebuilt extent Dk0' during the subsequent rebuilding process. So far, destination storage devices have been selected for all failed extents in the failed storage device D5.

As seen from the examples in FIGS. 7 to 9, with example implementations of the present disclosure, extents in reserved space in normal storage devices may be fully utilized. In this way, rebuild destinations may be selected for failed extents in a failed storage device in a more convenient and effective way.

According to example implementations of the present disclosure, besides the above first count, the destination storage device may further be selected based on the number of free reserved extents included in the normal storage device. Specifically, a second count of free reserved extents in a group of reserved extents in the normal storage device may be determined. Suppose two or more normal storage devices have the same first counts, then the destination storage device may be selected according to the second count. For example, preferably, a normal storage device with a larger second count may be selected. With example implementations of the present disclosure, preferably, storage devices including more free reserved extents may be utilized so as to reach a balance between workloads of the plurality of storage devices.

Symbol A(i) is used to denote the first count for the $i^{th}$ normal storage device, symbol F(i) is used to denote the second count of the $i^{th}$ normal storage device, and a score Score(i) of the $i^{th}$ normal storage device may be built based on the first count and the second count. Specifically, Score(i) may be directly proportional to the first count and inversely proportional to the second count. For example, Score(i) may be denoted as Formula 1 below.

$$\text{Score}(i) = \frac{A(i)}{F(i)} \qquad \text{Formula 1}$$

By means of Formula 1, the less failed stripes which the $i^{th}$ normal storage device may serve is, the lower the score is; the larger the number of free reserved stripes included in the $i^{th}$ normal storage device is, the lower the score is. Preferably, a normal storage device with a lower score may be selected, so that a normal storage device with a higher score will be used for subsequent failed extents in the failed storage device.

According to example implementations of the present disclosure, Score(i) of the normal storage device may be denoted in another way. For example, the numerator and denominator in Formula 1 may be exchanged to form Formula 2. When Formula 2 is used to denote the score, preferably, a normal storage device with a higher score may be selected as a recovery destination.

$$\text{Score}(i) = \frac{F(i)}{A(i)} \qquad \text{Formula 2}$$

According to example implementations of the present disclosure, the destination storage device may further be selected based on the number of reserved extents that have been selected in the normal storage device. Specifically, a third count of reserved extents which have been selected for a rebuild in the group of reserved extents in the normal storage device may be determined. Suppose two or more normal storage devices have an equal first count, then the destination storage device may be selected according to the third count. For example, a normal storage device with a smaller third count may be preferably selected. It will be understood that if free reserved extents in a certain normal storage device are frequently selected, then free space in this normal storage device will run out soon. By selecting the destination based on the third count, it is possible to select free reserved space in various normal storage devices at a similar frequency, so as to balance workloads of the plurality of storage devices.

Symbol S(i) is used to denote the third count of the $i^{th}$ normal storage device, and a score Score(i) of the $i^{th}$ normal storage device may be built based on the first count and the third count. Specifically, Score(i) may be directly proportional to both the first count and the third count. For example, Score(i) may be denoted as Formula 3 below.

$$\text{Score}(i) = A(i) * S(i) \qquad \text{Formula 3}$$

By means of Formula 3, the fewer failed stripes that the $i^{th}$ normal storage device may serve, the lower is the score; and the smaller is the number of selected reserved stripes included in the $i^{th}$ normal storage device, the lower is the score. Preferably, a normal storage device with a lower score may be selected, so that a normal storage device with a higher score will be used for subsequent failed extents in the failed storage device.

According to example implementations of the present disclosure, Score(i) of the normal storage device may be determined based on the first count, the second count and the third count. At this point, Score(i) may be directly proportional to both the first count and the third count and inversely proportional to the second count. For example, Score(i) may be determined based on Formula 4 below.

$$\text{Score}(i) = \frac{A(i) * S(i)}{F(i)} \qquad \text{Formula 4}$$

According to example implementations of the present disclosure, when the storage device includes a large number of free reserved extents, F(i) will have a larger value, which leads to a quite small result of Formula 4 and further causes precision loss. At this point, a precision parameter may be added to Formula 4 so as to increase the precision of Score(i). For example, Score(i) may be denoted based on Formula 5 below.

$$\text{Score}(i) = \frac{A(i) * S(i) * \text{precision}}{F(i)} \qquad \text{Formula 5}$$

In Formula 5, precision stands for the precision parameter. According to example implementations of the present disclosure, the precision parameter may be set as the number m0 of extents included in reserved space in the storage device. With example implementations of the present disclosure, it may be ensured that Score(i) of the normal storage device is always larger than 1, so that the precision loss will not result from a value of the score that is too small.

According to example implementations of the present disclosure, the destination storage device may be selected from the group of normal storage devices based on Score(i) of the normal storage device. It will be understood that although description has been presented to examples of determining the score of the normal storage devices based on any of Formulas 1 to 5, the score may further be determined based on other formulas. For example, the numerator and denominator in Formula 5 may be exchanged, or any of Formulas 1 to 5 may be replaced with other more complex functions.

According to example implementations of the present disclosure, after a free reserved extent has been selected from the group of reserved extents in the destination storage device, since one failed stripe has been processed, both the number of free reserved extents in the storage system and the number of selected reserved extents change. Therefore, after a free reserved extent is selected, in addition to updating the first count for each storage device, it is further necessary to update the second count of free reserved extents in the group of reserved extents in the destination storage device and the third count of reserved extents which have been selected for a rebuild in the group of reserved extents in the destination storage device.

Specifically, after a free reserved extent in the destination storage device is selected for a current failed stripe, the value of the first count may be decreased by 1, the value of the second count may be decreased by 1, and the value of the third count may be increased by 1. With example implementations of the present disclosure, the first count, second count and third count may be updated in real time based on the latest status of the storage system, so as to ensure that extents in reserved space may be sufficiently utilized as much as possible.

Figure 10:
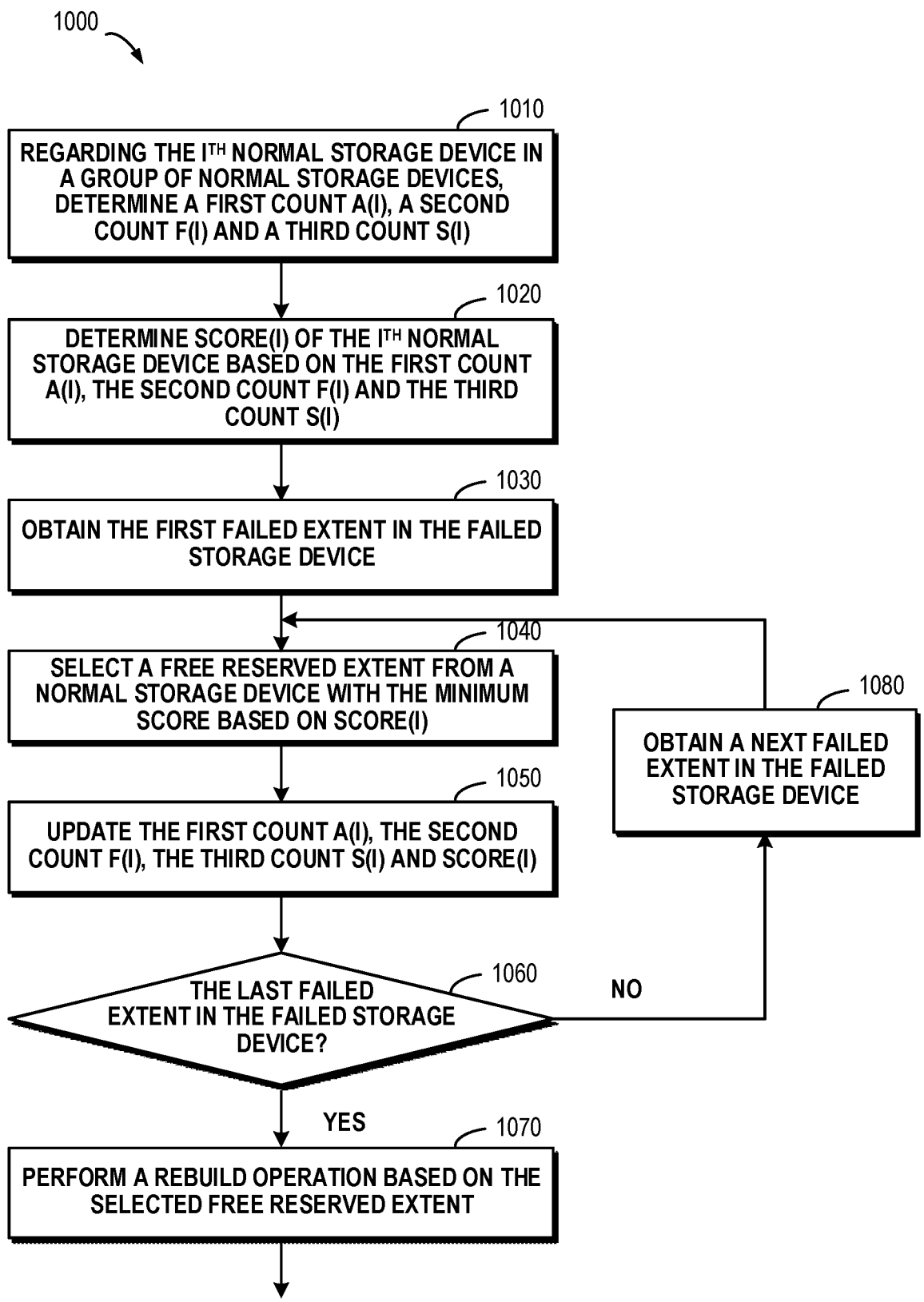
FIG. 10 schematically shows a flowchart of a method for rebuilding a failed extent in a failed storage device in a storage system according to example implementations of the present disclosure.

According to example implementations of the present disclosure, a destination storage device for rebuilding a further failed stripe in the group of failed stripes may be selected from the group of normal storage devices based on the updated first count, second count and third count. With example implementations of the present disclosure, a corresponding destination may be selected for each failed extent in the failed storage device one by one. With reference to FIG. 10, description is presented below on how to select a rebuild destination for each extent among failed extents in a storage system.

FIG. 10 schematically shows a flowchart of a method 1000 for rebuilding a failed extent in a failed storage device in a storage system according to example implementations of the present disclosure. At block 1010, a first count A(i), a second count F(i) and a third count S(i) may be determined for the $i^{th}$ normal storage device in a group of normal storage devices. Specifically, by means of the above method, it can be determined whether the $i^{th}$ normal storage device includes an extent in a failed stripe, so as to determine the first count for the $i^{th}$ normal storage device. Further, since no free reserved extent is yet selected, the second count F(i) may be set as the number m0 of reserved extents in reserved space in the normal storage device, and the third count S(i) may be set to 0.

At block 1020, Score(i) of the $i^{th}$ normal storage device may be determined based on the first count A(i), the second count F(i) and the third count S(i). For example, Score(i) may be determined based on Formula 4. At block 1030, a first failed extent in the failed storage device may be obtained, and a rebuild destination may be selected for the failed extent according to the above method.

At block 1040, a normal storage device with the minimum score may be determined based on Score(i), and a free reserved extent may be selected from the normal storage device. At block 1050, the first countA(i), the second count F(i) and the third count S(i) may be updated. Specifically, the first countA(i) may be decreased by 1, the second count F(i) may be decreased by 1, and the third count S(i) may be increased by 1. Subsequently, the updated Score(i) of the $i^{th}$ normal storage device may be determined based on the updated first count A(i), second count F(i) and third count S(i).

At block 1060, it may be determined whether a current failed extent is the last extent in the failed storage device or not. If the judgment results in "yes," then the method 1000 proceeds to block 1070 to perform a rebuild operation based on the selected free reserved extent. If the judgment results in "no," then the method 1000 proceeds to block 1080 to obtain the next failed extent from the failed storage device. Subsequently, the method 1000 returns to block 1040 to select a rebuild destination for the next failed extent. With example implementations of the present disclosure, the complexity of operations for selecting the destination storage device may be n*(m−m0). As compared with technical solutions for back tracking and reselecting a destination storage device after the case shown in FIG. 4 occurs, with example implementations of the present disclosure, it is possible to make sufficient use of extents in reserved space and select a destination storage device at lower complexity.

According to example implementations of the present disclosure, after a destination is selected for each failed extent in the failed storage device, data in the failed extent may be recovered to the selected destination. Specifically, based on rules of RAID, data in the failed extent may be rebuilt using a group of further extents other than the failed extent in the failed stripe. For example, an "XOR" operation may be performed on data in the group of further extents to generate rebuilt data. Further, the rebuilt data may be stored to a free reserved extent in a group of reserved extents in the selected normal storage device. According to example implementations of the present disclosure, each failed extent in the failed storage device may be handled one by one, so as to perform a recovery operation. Further, the recovery operation may be performed in parallel, in series and/or a combination thereof.

With example implementations of the present disclosure, based on the above formulas, it is possible to easily and quickly determine where the failed extent in the failed device will be recovered to. Further, since schematic implementations of the present disclosure consider various factors for selecting a destination, it is possible to make more use of reserved space in various storage devices in the storage system.

It will be understood that although schematic implementations of the present disclosure have been described in the context that one storage device fails in a 4D+1P storage system, schematic implementations may further be implemented in other storage systems. For example, 2 devices are allowed to fail in a 4D+1P+1Q storage system. In another example, 3 storage devices are allowed to fail in a 4D+1P+1Q+1R storage system. At this point, a corresponding destination may be selected for each failed extent in a failed stripe.

While examples of the method according to the present disclosure have been described in detail with reference to FIGS. 2 to 10, description is presented below for the implementation of a corresponding apparatus. According to example implementations of the present disclosure, an apparatus is provided for selecting a rebuild destination in a storage system including a plurality of storage devices. The apparatus includes: a detecting module configured to detect a group of failed stripes associated with a group of failed extents in a failed storage device among the plurality of storage devices; a determining module configured to determine a group of normal storage devices other than the failed storage device among the plurality of storage devices; an obtaining module configured to, regarding a normal storage device in the group of normal storage devices, obtain a first count for the normal storage device, the first count representing a number of failed stripes which are allowed to be rebuilt to the normal storage device in the group of failed stripes; and a selecting module configured to select, based on the first count, a destination storage device from the group of normal storage devices for rebuilding a failed stripe in the group of failed stripes.

According to example implementations of the present disclosure, the obtaining module includes: a status determining module configured to, regarding a failed stripe in the group of failed stripes, determine whether the failed stripe involves the normal storage device or not; and an updating module configured to update the first count in accordance with determining that the failed stripe does not involve the normal storage device.

According to example implementations of the present disclosure, the status determining module includes: a storage device determining module configured to determine a group of storage devices where a group of extents in the failed stripe reside, respectively; and an association determining module configured to, in accordance with determining that the normal storage device is different from any storage device in the group of storage devices, determine that the failed stripe does not involve the normal storage device.

According to example implementations of the present disclosure, the selecting module includes: a destination selecting module configured to select a normal storage device with a smaller first count from the group of normal storage devices as the destination storage device.

According to example implementations of the present disclosure, a storage device among the plurality of storage devices includes a group of reserved extents.

According to example implementations of the present disclosure, the selecting module further includes: a free extent determining module configured to determine a second count of free reserved extents in the group of reserved extents in the normal storage device; and the selecting module is further configured to select the destination storage device according to the second count.

According to example implementations of the present disclosure, the selecting module further includes: a rebuild extent determining module configured to determine a third count of reserved extents which have been selected for a rebuild in the group of reserved extents in the normal storage device; and the selecting module is further configured to select the destination storage device based on the third count.

According to example implementations of the present disclosure, the apparatus further includes: a score determining module configured to determine a score of the normal storage device based on the first count, the second count and the third count, the score being directly proportional to the first count and the third count and being inversely proportional to the second count; and the selecting module is further configured to select the destination storage device from the group of normal storage devices based on the score of the normal storage device.

According to example implementations of the present disclosure, the apparatus further includes: an extent selecting module configured to select a free reserved extent from a group of reserved extents in the destination storage device; and a count updating module configured to update the first counts for the group of normal storage devices, a second count of free reserved extents in a group of reserved extents in the destination storage device, and a third count of reserved extents which have been selected for a rebuild in the group of reserved extents in the destination storage device.

According to example implementations of the present disclosure, the selecting module is further configured to select a destination storage device from the group of normal storage devices based on the updated first count, second count and third count for rebuilding a further failed stripe in the group of failed stripes.

According to example implementations of the present disclosure, the apparatus further includes: a rebuilding module configured to rebuild data in the failed extent based on a group of extents other than the failed extent in the failed stripe; and a storage module configured to store the rebuilt data to a free reserved extent in a group of reserved extents in the selected normal storage device.

Figure 11:
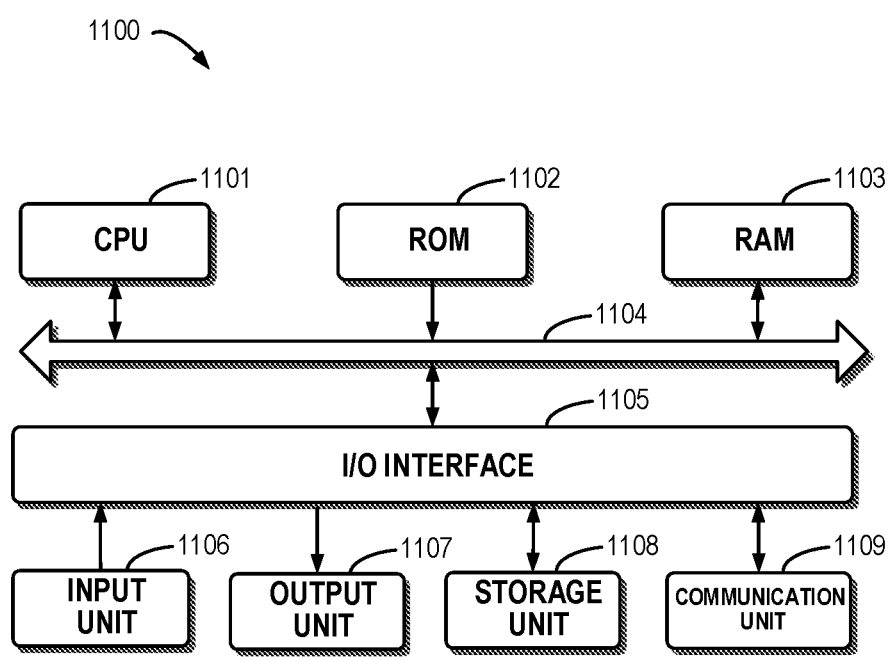
FIG. 11 schematically shows a block diagram of a device for selecting a rebuild destination in a storage system according to example implementations of the present disclosure.

FIG. 11 schematically shows a block diagram of a device 1100 for managing a storage system according to example implementations of the present disclosure. As depicted, the device 1100 includes a central processing unit (CPU) 1101, which can execute various suitable actions and processing based on the computer program instructions stored in the read-only memory (ROM) 1102 or computer program instructions loaded in the random-access memory (RAM) 1103 from a storage unit 1108. The RAM 1103 can also store all kinds of programs and data required by the operations of the device 1100. CPU 1101, ROM 1102 and RAM 1103 are connected to each other via a bus 1104. The input/output (I/O) interface 1105 is also connected to the bus 1104.

A plurality of components in the device 1100 are connected to the I/O interface 1105, including: an input unit 1106, such as a keyboard, mouse and the like; an output unit 1107, e.g., various kinds of displays and loudspeakers etc.; a storage unit 1108, such as a magnetic disk and optical disk, etc.; and a communication unit 1109, such as a network card, modem, wireless transceiver and the like. The communication unit 1109 allows the device 1100 to exchange information/data with other devices via the computer network, such as Internet, and/or various telecommunication networks.

The above described process and treatment, such as the methods 600 and 1000, can also be executed by the processing unit 1101. For example, in some implementations, the methods 600 and 1000 can be implemented as a computer software program tangibly included in the machine-readable medium, e.g., the storage unit 1108. In some implementations, the computer program can be partially or fully loaded and/or mounted to the device 1100 via ROM 1102 and/or the communication unit 1109. When the computer program is loaded to the RAM 1103 and executed by the CPU 1101, one or more steps of the above described methods 600 and 1000 can be implemented. Alternatively, in other implementations, the CPU 1101 also can be configured in other suitable ways to realize the above procedure/method.

According to example implementations of the present disclosure, an electronic device is provided, the electronic device including: at least one processor; and a memory coupled to the at least one processor, the memory having instructions stored thereon, the instructions, when executed by the at least one processor, causing the electronic device to perform acts for selecting a rebuild destination in a storage system, which includes a plurality of storage devices. The acts include: detecting a group of failed stripes associated with a group of failed extents in a failed storage device among the plurality of storage devices; determining a group of normal storage devices other than the failed storage device among the plurality of storage devices; regarding a normal storage device in the group of normal storage devices, obtaining a first count for the normal storage device, the first count representing a number of failed stripes which are allowed to be rebuilt to the normal storage device in the group of failed stripes; and selecting, based on the first count, a destination storage device from the group of normal storage devices for rebuilding a failed stripe in the group of failed stripes.

According to example implementations of the present disclosure, obtaining the first count for the normal storage device includes: regarding a failed stripe in the group of failed stripes, determining whether the failed stripe involves the normal storage device or not; and updating the first count in accordance with determining that the failed stripe does not involve the normal storage device.

According to example implementations of the present disclosure, determining whether the failed stripe involves the normal storage device or not includes: determining a group of storage devices where a group of extents in the failed stripe reside, respectively; and in accordance with determining that the normal storage device is different from any storage device in the group of storage devices, determining that the failed stripe does not involve the normal storage device.

According to example implementations of the present disclosure, selecting the destination storage device from the group of normal storage devices includes: selecting a normal storage device with a smaller first count from the group of normal storage devices as the destination storage device.

According to example implementations of the present disclosure, a storage device among the plurality of storage devices includes a group of reserved extents, and selecting the destination storage device from the group of normal storage devices includes: determining a second count of free reserved extents in the group of reserved extents in the normal storage device; and selecting the destination storage device according to the second count.

According to example implementations of the present disclosure, selecting the destination storage device from the group of normal storage devices includes: determining a third count of reserved extents which have been selected for a rebuild in the group of reserved extents in the normal storage device; and selecting the destination storage device based on the third count.

According to example implementations of the present disclosure, the acts further include: determining a score of the normal storage device based on the first count, the second count and the third count, the score being directly proportional to the first count and the third count and being inversely proportional to the second count; and selecting the destination storage device from the group of normal storage devices based on the score of the normal storage device.

According to example implementations of the present disclosure, the acts further include: selecting a free reserved extent from a group of reserved extents in the destination storage device; and updating the first counts for the group of normal storage devices, a second count of free reserved extents in a group of reserved extents in the destination storage device, and a third count of reserved extents which have been selected for a rebuild in the group of reserved extents in the destination storage device.

According to example implementations of the present disclosure, the acts further include: selecting a destination storage device from the group of normal storage devices based on the updated first count, second count and third count for rebuilding a further failed stripe in the group of failed stripes.

According to example implementations of the present disclosure, the acts further include: rebuilding data in the failed extent based on a group of extents other than the failed extent in the failed stripe; and storing the rebuilt data to a free reserved extent in a group of reserved extents in the selected normal storage device.

According to example implementations of the present disclosure, there is provided a computer program product. The computer program product is tangibly stored on a non-transitory computer-readable medium and includes machine-executable instructions which are used to implement the method according to the present disclosure.

According to example implementations of the present disclosure, there is provided a computer-readable medium. The computer-readable medium has machine-executable instructions stored thereon, the machine-executable instructions, when executed by at least one processor, causing the at least one processor to implement the method according to the present disclosure.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transitory signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to implementations of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular way, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable others of ordinary skill in the art to understand implementations of the present disclosure.

We claim:

1. A method for selecting a rebuild destination in a storage system, the storage system comprising a plurality of storage devices, the method comprising:
   detecting a group of failed stripes associated with a group of failed extents in a failed storage device among the plurality of storage devices;
   determining a group of normal storage devices other than the failed storage device among the plurality of storage devices;
   regarding a normal storage device in the group of normal storage devices, obtaining a first count for the normal storage device, the first count representing a number of failed stripes which are allowed to be rebuilt to the normal storage device in the group of failed stripes; and
   selecting, based on the first count, a destination storage device from the group of normal storage devices for rebuilding a failed stripe in the group of failed stripes;
   wherein selecting the destination storage device from the group of normal storage devices comprises:
   selecting a normal storage device with a smaller first count from the group of normal storage devices as the destination storage device.

2. The method of claim 1, wherein obtaining the first count for the normal storage device comprises: regarding a failed stripe in the group of failed stripes,
   determining whether the failed stripe involves the normal storage device or not; and
   updating the first count in accordance with determining that the failed stripe does not involve the normal storage device.

3. The method of claim 2, wherein determining whether the failed stripe involves the normal storage device or not comprises:
   determining a group of storage devices where a group of extents in the failed stripe reside, respectively; and
   in accordance with determining that the normal storage device is different from any storage device in the group of storage devices, determining that the failed stripe does not involve the normal storage device.

4. The method of claim 1, further comprising: selecting a free reserved extent from a group of reserved extents in the destination storage device; and updating the first count for the group of normal storage devices, a second count of free reserved extents in a group of reserved extents in the destination storage device, and a third count of reserved extents which have been selected for a rebuild in the group of reserved extents in the destination storage device.

5. The method of claim 4, further comprising:
   selecting a destination storage device from the group of normal storage devices based on the updated first count, second count and third count for rebuilding a further failed stripe in the group of failed stripes.

6. The method of claim 1, further comprising:
   rebuilding data in a failed extent of the group of failed extents; and
   storing the rebuilt data to a free reserved extent in the selected normal storage device.

7. The method of claim 1, A method for selecting a rebuild destination in a storage system, the storage system comprising a plurality of storage devices, the method comprising:
   detecting a group of failed stripes associated with a group of failed extents in a failed storage device among the plurality of storage devices;

determining a group of normal storage devices other than the failed storage device among the plurality of storage devices;

regarding a normal storage device in the group of normal storage devices, obtaining a first count for the normal storage device, the first count representing a number of failed stripes which are allowed to be rebuilt to the normal storage device in the group of failed stripes; and selecting, based on the first count, a destination storage device from the group of normal storage devices for rebuilding a failed stripe in the group of failed stripes wherein a storage device among the plurality of storage devices comprises a group of reserved extents, and selecting the destination storage device from the group of normal storage devices comprises:

determining a second count of free reserved extents in the group of reserved extents in the normal storage device; and selecting the destination storage device according to the second count.

8. The method of claim 7, wherein selecting the destination storage device from the group of normal storage devices comprises:

determining a third count of reserved extents which have been selected for a rebuild in the group of reserved extents in the normal storage device; and selecting the destination storage device based on the third count.

9. The method of claim 8, further comprising:

determining a score of the normal storage device based on the first count, the second count and the third count, the score being directly proportional to the first count and the third count and being inversely proportional to the second count; and selecting the destination storage device from the group of normal storage devices based on the score of the normal storage device.

10. An electronic device, comprising:

at least one processor; and a memory coupled to the at least one processor, the memory having instructions stored thereon, the instructions, when executed by the at least one processor, causing the electronic device to perform acts for selecting a rebuild destination in a storage system comprising a plurality of storage devices, the acts including:

detecting a group of failed stripes associated with a group of failed extents in a failed storage device among the plurality of storage devices;

determining a group of normal storage devices other than the failed storage device among the plurality of storage devices;

regarding a normal storage device in the group of normal storage devices, obtaining a first count for the normal storage device, the first count representing a number of failed stripes which are allowed to be rebuilt to the normal storage device in the group of failed stripes; and selecting, based on the first count, a destination storage device from the group of normal storage devices for rebuilding a failed stripe in the group of failed stripes;

wherein selecting the destination storage device from the group of normal storage devices comprises:

selecting a normal storage device with a smaller first count from the group of normal storage devices as the destination storage device.

11. The electronic device of claim 10, wherein obtaining the first count for the normal storage device comprises: regarding a failed stripe in the group of failed stripes, determining whether the failed stripe involves the normal storage device or not; and updating the first count in accordance with determining that the failed stripe does not involve the normal storage device.

12. The electronic device of claim 11, wherein determining whether the failed stripe involves the normal storage device or not comprises:

determining a group of storage devices where a group of extents in the failed stripe reside, respectively; and in accordance with determining that the normal storage device is different from any storage device in the group of storage devices, determining that the failed stripe does not involve the normal storage device.

13. The electronic device of claim 10, the acts further comprising: selecting a free reserved extent from a group of reserved extents in the destination storage device; and updating the first count for the group of normal storage devices, a second count of free reserved extents in a group of reserved extents in the destination storage device, and a third count of reserved extents which have been selected for a rebuild in the group of reserved extents in the destination storage device.

14. The electronic device of claim 13, the acts further comprising:

selecting a destination storage device from the group of normal storage devices based on the updated first count, second count and third count for rebuilding a further failed stripe in the group of failed stripes.

15. An electronic device, comprising:

at least one processor; and a memory coupled to the at least one processor, the memory having instructions stored thereon, the instructions, when executed by the at least one processor, causing the electronic device to perform acts for selecting a rebuild destination in a storage system comprising a plurality of storage devices, the acts including:

detecting a group of failed stripes associated with a group of failed extents in a failed storage device among the plurality of storage devices;

determining a group of normal storage devices other than the failed storage device among the plurality of storage devices;

regarding a normal storage device in the group of normal storage devices, obtaining a first count for the normal storage device, the first count representing a number of failed stripes which are allowed to be rebuilt to the normal storage device in the group of failed stripes; and selecting, based on the first count, a destination storage device from the group of normal storage devices for rebuilding a failed stripe in the group of failed stripes;

wherein a storage device among the plurality of storage devices comprises a group of reserved extents, and selecting the destination storage device from the group of normal storage devices comprises:

determining a second count of free reserved extents in the group of reserved extents in the normal storage device; and selecting the destination storage device according to the second count.

16. The electronic device of claim 15, wherein selecting the destination storage device from the group of normal storage devices comprises:
- determining a third count of reserved extents which have been selected for a rebuild in the group of reserved extents in the normal storage device; and
- selecting the destination storage device based on the third count.

17. The electronic device of claim 16, the acts further comprising:
- determining a score of the normal storage device based on the first count, the second count and the third count, the score being directly proportional to the first count and the third count and being inversely proportional to the second count; and
- selecting the destination storage device from the group of normal storage devices based on the score of the normal storage device.

18. A computer program product having a non-transitory computer readable medium which stores a set of instructions to select a rebuild destination in a storage system, the storage system comprising a plurality of storage devices; the set of instructions, when carried out by computerized circuitry, causing the computerized circuitry to perform a method of:
- detecting a group of failed stripes associated with a group of failed extents in a failed storage device among the plurality of storage devices;
- determining a group of normal storage devices other than the failed storage device among the plurality of storage devices;
- regarding a normal storage device in the group of normal storage devices, obtaining a first count for the normal storage device, the first count representing a number of failed stripes which are allowed to be rebuilt to the normal storage device in the group of failed stripes; and
- selecting, based on the first count, a destination storage device from the group of normal storage devices for rebuilding a failed stripe in the group of failed stripes;

wherein selecting the destination storage device from the group of normal storage devices comprises:
- selecting a normal storage device with a smaller first count from the group of normal storage devices as the destination storage device.

19. A method for selecting a rebuild destination in a storage system, the storage system comprising a plurality of storage devices, the method comprising: detecting a group of failed stripes associated with a group of failed extents in a failed storage device among the plurality of storage devices; determining a group of normal storage devices other than the failed storage device among the plurality of storage devices; regarding a normal storage device in the group of normal storage devices, obtaining a first count for the normal storage device, the first count representing a number of failed stripes which are allowed to be rebuilt to the normal storage device in the group of failed stripes; selecting, based on the first count, a destination storage device from the group of normal storage devices for rebuilding a failed stripe in the group of failed stripes; selecting a free reserved extent from a group of reserved extents in the destination storage device; and updating the first count for the group of normal storage devices, a second count of free reserved extents in a group of reserved extents in the destination storage device, and a third count of reserved extents which have been selected for a rebuild in the group of reserved extents in the destination storage device.

20. The method of claim 19, further comprising:
- selecting a destination storage device from the group of normal storage devices based on the updated first count, second count and third count for rebuilding a further failed stripe in the group of failed stripes.

* * * * *

UNITED STATES PATENT AND TRADEMARK OFFICE
CERTIFICATE OF CORRECTION

PATENT NO. : 11,500,726 B2
APPLICATION NO. : 16/936710
DATED : November 15, 2022
INVENTOR(S) : Baote Zhuo et al.

It is certified that error appears in the above-identified patent and that said Letters Patent is hereby corrected as shown below:

In the Claims

Column 20, Line 62, cancel the text "The method of claim 1,".

Signed and Sealed this
Third Day of January, 2023

Katherine Kelly Vidal
*Director of the United States Patent and Trademark Office*